United States Patent [19]
Right

[11] Patent Number: 4,828,469
[45] Date of Patent: May 9, 1989

[54] BLOWING NOZZLE FOR CERAMIC FIBER PRODUCTION

[75] Inventor: Jamal Right, North Canton, Ohio

[73] Assignee: The Babcock & Wilcox Company, New Orleans, La.

[21] Appl. No.: 161,871

[22] Filed: Feb. 29, 1988

[51] Int. Cl.$^4$ ............................................. B22D 11/01
[52] U.S. Cl. ........................................... 425/7; 264/12
[58] Field of Search .......................... 425/6, 7; 264/12

[56] References Cited
U.S. PATENT DOCUMENTS

| | | | |
|---|---|---|---|
| 2,743,136 | 4/1956 | Auer | 239/601 |
| 4,001,357 | 1/1977 | Walz et al. | 264/12 |
| 4,539,029 | 9/1985 | Muschelknautz et al. | 264/12 |

Primary Examiner—Bernard Nozick
Attorney, Agent, or Firm—Vytas R. Matas; Robert J. Edwards; Daniel S. Kalka

[57] ABSTRACT

An improved blowing nozzle for ceramic fiber production is disclosed. The bore in the entrance to the nozzle has a larger size minimizing the impingement of molten material thereon and the formation of flakes at the nozzle entrance. In addition, the nozzle has a longer barrel resulting in the prodution of longer and thicker fibers having a higher tensile strength.

9 Claims, 2 Drawing Sheets

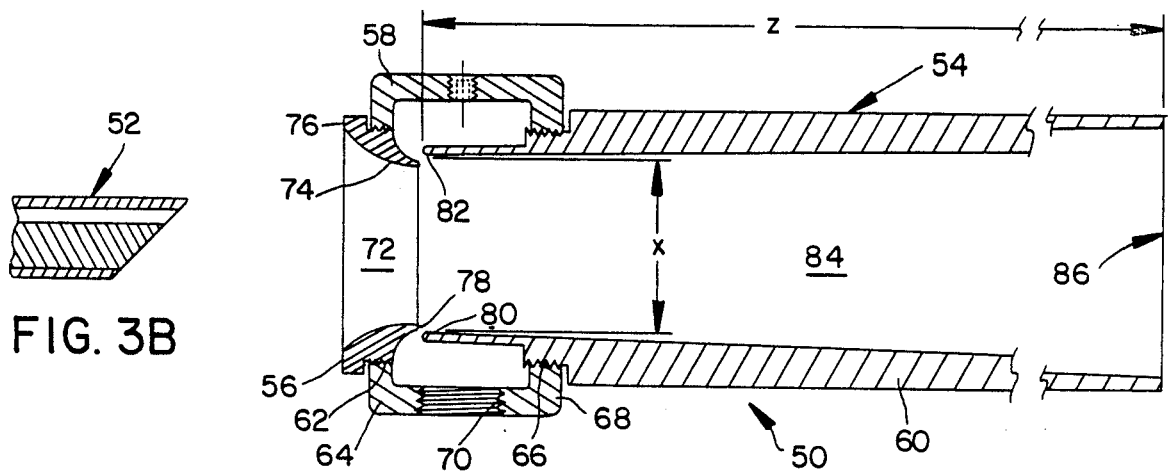
FIG. 3B
FIG. 3A
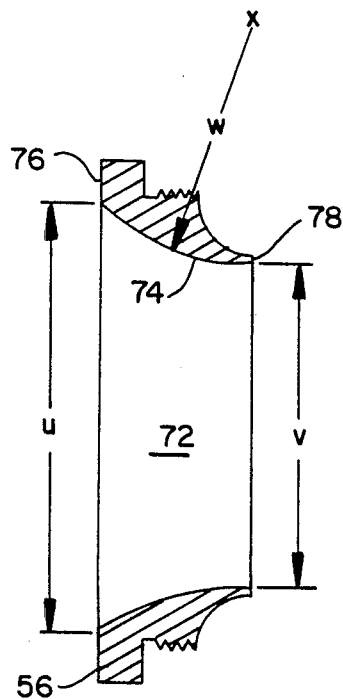
FIG. 4

BLOWING NOZZLE FOR CERAMIC FIBER PRODUCTION

TECHNICAL FIELD

The present invention relates generally to an apparatus for producing inorganic fibers and more particularly to an improved apparatus for producing inorganic fibers having higher tensile strength than that presently obtainable with prior art apparatus.

BACKGROUND ART

The manufacture of inorganic fibers typically requires two steps, viz., releasing a stream of molten inorganic material and subjecting the molten stream to some type of fiberizing means. There are two commercially known methods for fiberizing the molten stream of inorganic material—spinning and blowing. In the spinning methods, the fiberizing of the molten stream is achieved by means of rotating discs. The molten stream falls directly on the rotating discs and is fiberized thereby. In the blowing method, the molten stream is subjected to a high velocity blast of a gas, such as steam or air, from a blowing nozzle positioned adjacent the molten stream. The function of the blowing nozzle is to change the direction of motion of the molten stream from vertical to horizontal, breaking up the stream into globules which are subsequently attenuated into fibers, such as disclosed in U.S. Pat. No. 2,743,136. The molten stream may come into contact with the body of the blowing nozzle, however, no physical contact is required in order to change the direction of the molten stream and to break up the stream into fibers.

Alternately, two blowing nozzles can be used, a primary nozzle and a secondary nozzle having an opening substantially parallel to the axis of the primary nozzle. The primary nozzle consists of a number of high velocity air streams emanating from a plurality of orifices provided therein. The secondary nozzle is a venturi-type nozzle producing very high air velocities to fiberize the molten material. In this case, raw ceramic materials are melted electrically in a furnace, and the melt is tapped from the furnace in the form of a continuous molten stream and/or droplets. The continuous molten stream and/or droplets is permitted to flow so as to be subjected to high velocity air streams from the primary nozzle which breaks the melt into fine ligaments which are drawn into the secondary nozzle wherein they undergo further high shearing and cooling rates to produce ceramic fibers. It has been found that the apparatus utilized for this process has some inherent disadvantages in that the amount of material which remains unfiberized is significant thus producing lower quality products. In addition, it has been further found that the impingement of the molten material on the entrance surface into the secondary nozzle causes the impinging melt to solidify in the form of flakes and globules which are not desirable. And lastly, the length of the fibers produced by this present blowing apparatus is undesirably short causing the resulting fibrous material to have a low tensile strength which severely affects the handleability of material produced from the fibers.

Another method for blowing inorganic materials to produce fibrous material is disclosed in U.S. Pat. No. 4,001,357. In this reference, the melt stream is passed through a Laval nozzle operated at high pressure so as to generate supersonic gas velocities. The nozzle velocities are selected so as to cause an abrupt temperature drop in the flow medium within the nozzle which causes the melt to solidify into fibers. The fibers produced by this apparatus have very short lengths (between 2 and 20 mm.) The materials produced from short fibers are known to have a very low tensile strength and extremely poor handleability.

Because of the foregoing, it has become desirable to develop apparatus for producing fibers that are both longer and have larger diameters than that presently available so as to increase the tensile strength of the material produced therefrom, and to increase the percentage of molten material ultimately converted into fibers.

SUMMARY OF THE INVENTION

The present invention solves the problems associated with the prior art and other problems by providing a novel structure for the secondary nozzle utilized in conjunction with a primary nozzle for fiberizing the molten material. The entrance into the secondary nozzle has a unique shape and larger size minimizing the impingement of molten material thereon. In this manner, the formation of flakes and globules at the entrance way to the secondary nozzle is minimized thus alleviating the problems associated with the incorporation of the flakes in the end product. In addition, the secondary nozzle has a longer barrel resulting in the complete solidification of the molten material therein so as to produce longer and thicker fibers. Thus, the resulting material produced from the fibers has a higher tensile strength which improves the handleability of same.

BRIEF DESCRIPTION OF THE DRAWINGS

FIG. 3 is a cross-sectional view of the improved blowing nozzle assembly of the present invention showing the primary nozzle and the secondary nozzle thereof.

FIG. 4 is an enlarged, partial cross-sectional view of the entrance disc utilized by the secondary nozzle of the present invention.

DESCRIPTION OF THE PREFERRED EMBODIMENT

Figure 1:
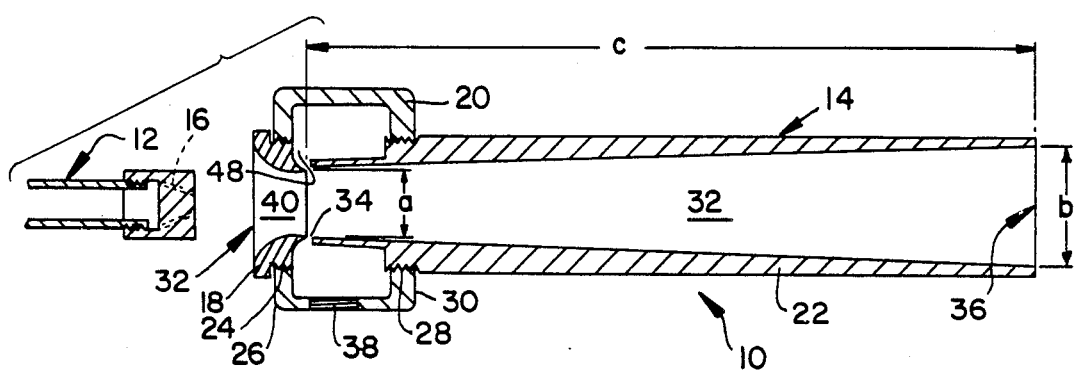
FIG. 1 is a cross-sectional view of a prior art blowing nozzle assembly showing the primary nozzle and the secondary nozzle.

Referring now to the drawings where the illustrations are for the purpose of describing the preferred embodiment of the present invention and are not intended to limit the invention hereto, FIG. 1 is a cross-sectional view of prior art apparatus 10 utilized for fiberizing molten material. As such, the prior art apparatus 10 includes a primary nozzle 12 and a secondary nozzle 14. The primary nozzle 12 has a plurality of orifices 16 at its exit end permitting a high velocity air stream to emanate from each of the orifices 16. Typically, the orifices 16 have a diameter of from 1 to 1.5 mm. The secondary nozzle 14 includes an entrance disc 18, a nozzle housing 20 and a nozzle barrel 22. The entrance disc 18 has threads 24 formed on a portion of the outer periphery thereof which engage complementary threads formed in a wall 26 in the nozzle housing 20. Similarly, the nozzle barrel 22 is provided with threads 28 on a portion of the outer surface thereof which engage complementary threads provided in a wall 30 which is oppositely disposed from wall 26 in the nozzle housing 20. It should be noted that the complementary threads in walls 26 and 30 of housing 20 are positioned so that the entrance disc 18 and the nozzle barrel 22 are aligned and their axes are coincident. In this manner, the entrance disc 18 will direct the fiberized material into the bore 32 within nozzle barrel 22. The inner diameter of the inlet 34 to the nozzle barrel 22 is typically between 1 to $1\frac{1}{4}$ inches (dimension a), whereas the inner diameter of the outlet 36 from the barrel 22 is generally between $1\frac{1}{2}$ to 2 inches (dimension b) resulting in the nozzle barrel bore 32 being tapered outwardly from the nozzle housing 20. The overall length of the nozzle barrel 22 is usually approximately 13 inches (dimension c) permitting the elongation of the fibers therein. An aperture 38 is provided in the nozzle housing 20 for the introduction of the fiberizing medium into the secondary nozzle 14.

Figure 2:
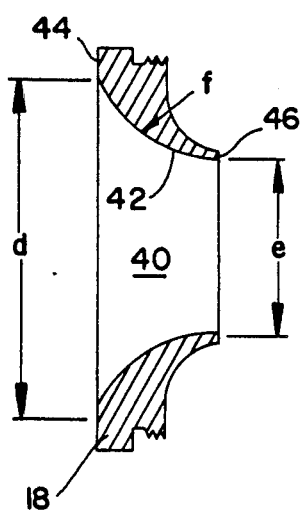
FIG. 2 is an enlarged, partial cross-sectional view of the entrance disc utilized by the secondary nozzle in the prior art blowing nozzle assembly in FIG. 1.

Referring to FIG. 2, it can be seen that the entrance disc 18 has a bore 40 therethrough defined by a continuous circumferential surface 42 from the face 44 of the disc to the annular end 46 thereof. The diameter of the inlet to the bore 40 is generally approximately 2 inches (dimension d), whereas the diameter of the outlet from the bore is typically between 1 to 11/4 inches (dimension e) so as to be compatible with the inner diameter of the inlet 34 to the nozzle barrel 22. The continuous circumferential surface 42 defining the bore 40 has a relatively small radius (in axial cross-section) of approximately $\frac{7}{8}$ inch (dimension f). The bore 40 defined by the continuous circumferential surface 42 has a decreasing transverse diameter in the axial direction throughout its entire length from the face 44 of the disc 18 to the annular end 46 thereof. The annular end 46 of the entrance disc 18 is adjacent to inlet 34 to the nozzle barrel 22, with a small annular gap 48 therebetween. The outwardly directed taper of the nozzle barrel bore 32 allows the passage of the fiberized material therethrough.

Operationally, a continuous molten stream and/or droplets of material to be fiberized is permitted to flow vertically between the primary nozzle 12 and the secondary nozzle 14 so as to intercept the plurality of high velocity air streams emanating from the orifices 16 within the primary nozzle 12. These high velocity air streams break the molten stream and/or droplets into fine ligaments which are drawn into the secondary nozzle 14 wherein they contact the fiberizing medium introduced into the nozzle housing 20 via the aperture 38 therein and undergo high shearing and cooling rates to produce elongated ceramic fibers. It has been found that impingement of the molten stream and/or droplets on the entrance disc 18 of the secondary nozzle 14 causes the impinging melt to solidify in the form of flakes and/or globules on the entrance disc 18. In addition, it has been found that use of this prior art apparatus 10 results in a significant percentage of the molten stream and/or droplets remaining unfiberized thus producing lower quality products. It has been further found that the length of the fibers produced by this prior art apparatus 10 is undesirably short resulting in the fibrous material produced therefrom having a low tensile strength which severely affects its handleability. The fibers produced by this apparatus have an average length of about 4 inches and an average diameter of the fiber of about 1.4 microns.

Referring now to FIG. 3 which is a cross-sectional view of the improved blowing nozzle apparatus 50 of the present invention, this apparatus 50 includes a primary nozzle 52 and a secondary nozzle 54. The primary nozzle 52 is old in the art, and thus, forms no part of the present invention. The secondary nozzle 54 includes an entrance disc 56, a nozzle housing 58 and a nozzle barrel 60. The entrance disc 56 has threads 62 formed on a portion of the outer periphery thereof which engage complementary threads formed in a wall 64 in the nozzle housing 58. Similarly, the nozzle barrel 60 is provided with threads 66 on a portion of the outer surface thereof which engage complementary threads provided in a wall 68 which is oppositely disposed from wall 64 in the nozzle housing 58. The complementary threads in walls 64 and 68 of housing 58 are positioned so that the entrance disc 56 and the nozzle barrel 60 are aligned and their axes are coincident. The nozzle housing 58 is also provided with an aperture 70 for the introduction of the fiberizing medium into the secondary nozzle 54.

As shown in FIGS. 3 and 4, the entrance disc 56 is of a unique design since the bore 72 therethrough has a substantially greater diameter than the bore 40 in the prior art secondary nozzle 14 and is defined by a continuous circumferential surface 74 having a radius (in axial cross-section) that is substantially greater than that used in the prior art. For example, the diameter of the inlet to the bore 72 is generally between $2\frac{1}{2}$ to 3 inches (dimension u) in contrast to approximately 2 inches for the prior art nozzle, the diameter of the outlet from the bore is typically approximately 2 inches (dimension v) in contrast to 1 to $1\frac{1}{4}$ inches for the prior art; and the radius (in axial cross-section) of the continuous circumferential surface is generally approximately $1\frac{1}{2}$ inches (dimension w) in contrast to $\frac{7}{8}$ inches for the prior art. The foregoing increases in the diameter of the bore 72 and in the radius of the continuous circumferential surface 74 increases suction into the secondary nozzle 54 and improves melt break-up into ligaments. The bore 72 defined by the continuous circumferential surface 74 has a decreasing transverse diameter in the axial direction throughout its entire length from the face 76 to the annular end 78 of the entrance disc 56. The annular end 78 of the entrance disc 56 is adjacent the inlet 80 to the nozzle barrel 60 with a small annular gap 82 therebetween. As in the prior art apparatus, the bore 84 within nozzle barrel 60 is tapered outwardly from the nozzle housing 58 allowing the passage of fiberized material therethrough, however, the axial length of the nozzle barrel 60 and the diameter of the nozzle bore are substantially greater than corresponding measurements of the nozzle barrel 22 in the prior art apparatus 10. For example, the inner diameter of the inlet 80 to the nozzle barrel 60 is typically between 2 to $2\frac{1}{4}$ inches (dimension x) in contrast to 1 to $1\frac{1}{4}$ inches for the prior art barrel; the inner diameter of the outlet 86 from the barrel is generally between 3 to $3\frac{1}{4}$ inches (dimension y) in contrast to $1\frac{1}{2}$ to 2 inches for the prior art barrel; and the length of the barrel is approximately 18 inches (dimension z) in contrast to 13 inches for the prior art. The foregoing increases in the diameter of the bore within the nozzle barrel and the overall length of same result in greater elongation of the fibers as they pass therethrough.

Operationally, the primary nozzle 52 is a jet-type nozzle which achieves high air velocities. The air pressure applied to the primary nozzle 52 and the flow rate therethrough are regulated. The diameter of the air jet formed by the primary nozzle 52 is large enough relative to the diameter of the melt stream passing adjacent the exit of the primary nozzle 52 so that the melt stream is completely surrounded by a high velocity shear layer. This shear layer induces the breakup of the melt stream which forms the initial fibers.

Regulated high pressure air is introduced into the secondary nozzle via the aperture 70 in the nozzle housing 58. This high pressure air forms a supersonic shear layer emanating from the annular gap 82 formed between the inlet 80 to the nozzle barrel 60 and the annular end 78 of the entrance disc 56. This shear layer is sustained while it expands until it exits from the nozzle barrel 60. The angle of divergence of the bore 84 through the nozzle barrel 60 is critical and is kept below 2°. The size of the annular gap 82 formed between the annular end 78 of the entrance disc 56 and the inlet 80 to the nozzle barrel 60 can be set to achieve the desired fiberization conditions. It has been found that the best operating air pressures are approximately 75 psig for the primary nozzle 52 and 75 to 95 psig for the secondary nozzle 54. The optimum annular gap 82 between the annular end 78 of the entrance disc 56 and the inlet 80 to the nozzle barrel 60 is achieved by first screwing in the nozzle barrel 60 until its inlet 80 is flush with the annular end 78 of the disc 56 and then turning the barrel 2.5-3 threads leaving an annular gap of about 0.03 inches therebetween. It has been further found that the optimum spacing between the primary nozzle 52 and the secondary nozzle 54 is approximately 2 inches with the melt stream midway between the nozzles.

The flow of the supersonic shear layer within the secondary nozzle 54 creates a vacuum at the inlet to the entrance disc 56. This vacuum then produces a suctioning effect on the melt stream causing the molten material to be drawn into the interior of the secondary nozzle 54. The theory of liquid breakup in an air blast, such as a supersonic shear layer of air, is well known and the mechanics for liquid droplets breakup are known to depend on the liquid melt properties, such as viscosity and surface tension, and will not be discussed herein. The foregoing apparatus 50 is operated in a manner that maximizes molten material breakup and provides sufficient energy from the air utilized by the primary nozzle 52 and the secondary nozzle 54 to shear the melt into fine fibers, which are subsequently elongated while passing through the nozzle barrel 60.

The present invention provides a number of advantages over the prior art apparatus. For example, the fibers produced by the present invention are both longer and have a larger diameter than those produced by prior art apparatus. There is no standard method for measuring the fiber length. Normally, a bulk sample is taken and separated gently until individual fibers are observed. Using this method, the fibers produced with the present invention measured in excess of 12 inches of length. The average diameter of the fiber is about 1.9–2.2 microns.

The material produced from these longer, larger diameter fibers has a higher tensile strength increasing the handleability of same. In addition, because of the unique configuration for the bore 72 within the entrance disc 56, it has been found that impingement of molten material of the disc 56 is minimized, thus reducing the production of flakes and/or globules thereon. In addition, it has been found that his unique design for the bore 72 within the entrance disc 56 also minimizes sticking of molten material on the disc which reduces the risk of plugging the entrance to the secondary nozzle 54 with accumulated melt. It has been further found that the design of the present invention minimizes impingement of the fibers on the interior of the nozzle barrel 60. This, in turn, reduces erosion of the barrel and increases the life of the same. And lastly, unlike some prior art apparatus, the molten stream does not come into contact with the blowing nozzle which would substantially reduce the life of same.

Although this improved nozzle design has been tested with Kaowool (50 percent alumina and 50 percent silica) and with a salt mixture, it should be noted that the apparatus can be used in the production of fibers form numerous materials such as other alumina-silica composition, glasses, metals, etc. In addition, it should be noted that even through the use of the present invention has been discussed using a primary nozzle mounted in the horizontal direction, the use of such a nozzle is not necessary and the secondary nozzle can be utilized alone in a vertical direction without adversely affecting results. And lastly, even though the present invention has been described using compressed air as the fiberizing medium, other gases or vapors can be used as the medium without adversely affecting the production of the fiberized material.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A nozzle for fiberizing material, comprising:
   an entrance having a bore therethrough with an inlet and an exit, said bore in said entrance member being defined by a continuous circumferential surface having a radius in axial cross-section of about 11/2 inches, said bore further being defined by a diameter decreasing transversely in an axial direction, said entrance member having means for engaging formed on a portion of the outer periphery thereof;
   an elongated barrel member having a bore therethrough with an inlet and an outlet, said bore in said barrel member being formed with an angle of divergence outwardly less than 2°, said inlet in said barrel member being axially aligned with and adjacent to said exit of said entrance member with an annular gap provided therebetween, said barrel member having means for engaging formed on a portion of the outer periphery thereof; and
   a housing member interposed between said entrance member and said barrel member and axially aligning said bore in said entrance member with said bore in said barrel member, said housing member having means for reciprocally engaging said entrance member and said barrel member together in an axial direction which provides for adjustment of said annular gap between said entrance member and said barrel member, said housing member further having means for introducing fiberizing medium therein.

2. The nozzle as defined in claim 1, wherein said inlet of said bore in said entrance member has a diameter of about 2½ to 3 inches.

3. The nozzle as defined in claim 1, wherein said exit of said bore in said entrance member has a diameter of about 2 inches.

4. The nozzle as defined in claim 1, wherein said inlet of said bore in said barrel member has a diameter of about 2 to 2¼ inches.

5. The nozzle as defined in claim 1, wherein said outlet of said bore in said barrel member has a diameter of about 3 to 3¼ inches.

6. The nozzle as defined in claim 1 wherein said nozzle barrel has a length of about 18 inches.

7. A nozzle for fiberizing material, comprising:

an entrance member having a bore therethrough with an inlet and an exit, said inlet in said entrance member having a diameter of about 2½ to 3 inches, said bore in said entrance member being defined by a continuous circumferential surface having a radius in axial cross-section of about 1½ inches, said bore further being defined by a diameter decreasing transversely in an axial direction, said exit of said entrance member having a diameter of about 2 inches;

an elongated barrel member having a bore therethrough with an inlet and an outlet, said barrel being about 18 inches long with said bore in said barrel member being formed with an angle of divergence outwardly less than about 2°, said inlet in said barrel member being axially aligned with and adjacent to said exit of said entrance member with an annular gap provided therebetween, said inlet in said barrel member having a diameter of about 2 to 2¼ inches, said outlet of said barrel member having a diameter of about 3 to 3¼ inches; and a housing member interposed between said entrance member and said barrel member and axially aligning said bore in said entrance member with said bore in said barrel member, said housing member having means for joining said entrance member and said barrel member together in an axial direction which provides for said annular gap of about 0.03 inch between said entrance member and said barrel member, said housing member further having means for introducing fiberizing medium therein.

8. An improved apparatus for producing fibers, having a primary nozzle for breaking melts with high air velocities and a secondary nozzle for fiberizing the melt stream, the secondary nozzle comprising:

an entrance member having a bore therethrough with an inlet and an exit, said inlet of said bore in said entrance member having a diameter of about 2½ to 3 inches, said bore in said entrance member being defined by a continuous circumferential surface having a radius in axial cross-section of about 1½ inches, said bore further being defined by a diameter decreasing transversely in an axial direction, said exit of said entrance member having a diameter of about 2 inches, said entrance member having means for engaging formed on a portion of the outer periphery thereof;

an elongated barrel member having a bore therethrough with an inlet and an outlet, said barrel being about 18 inches long with said bore in said barrel member being formed with an angle of divergence outwardly less than about 2°, said inlet in said barrel member being axially aligned with and adjacent to said exit of said entrance member with an annular gap provided therebetween, said inlet in said barrel member having a diameter of about 2 to 2¼ inches, said outlet of said barrel member having a diameter of about 3 to 3¼ inches, said barrel member having means for engaging formed on a portion of the outer periphery thereof; and a housing member interposed between said entrance member and said barrel member and axially aligning said bore in said entrance member with said bore in said barrel member, said housing member having means for reciprocally engaging said entrance member and said barrel member together in an axial direction which provides for the annular gap of about 0.03 inch between said entrance member and said barrel member, said housing member further having means for introducing fiberizing medium therein.

9. An apparatus according to claim 8, wherein the primary nozzle is spaced about 2 inches from the secondary nozzle.

* * * * *

UNITED STATES PATENT AND TRADEMARK OFFICE
CERTIFICATE OF CORRECTION

PATENT NO. : 4,828,469

DATED : May 9, 1989

INVENTOR(S) : Righi

It is certified that error appears in the above-identified patent and that said Letters Patent is hereby corrected as shown below: Item [19]: "Right" should read --Righi--.
Inventor, change "Right" to --Righi--.

ABSTRACT, line 6, change "prodution" to --production--.

Column 2, line 4, change "20" to --10--.

Column 3, line 25, change "11/4" to --1-1/4--.

Column 4, line 39, after "entire" add --axial--.

Column 5, line 63, change "his" to --this--.

Column 6, line 10, change "form" to --from--.

Column 6, lines 11-12, change "composition" to --compositions--.

Column 6, line 13, change "through" to --though--.

Claim 1, line 6, change "11/2" to --1-1/2--.

Signed and Sealed this

Thirty-first Day of October, 1989

*Attest:*

DONALD J. QUIGG

*Attesting Officer*   *Commissioner of Patents and Trademarks*